United States Patent
Venkatraman et al.

(10) Patent No.: US 9,693,321 B2
(45) Date of Patent: *Jun. 27, 2017

(54) APPARATUS FOR DISTRIBUTED ANTENNA SYSTEM WITH DOWNLINK TRANSMISSION POWER CONTROL

(71) Applicant: Intel Corporation, Santa Clara, CA (US)

(72) Inventors: Shankar Venkatraman, Irvine, CA (US); Khurram Parviz Sheikh, San Clemente, CA (US)

(73) Assignee: Intel Corporation, Santa Clara, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/677,696

(22) Filed: Apr. 2, 2015

(65) Prior Publication Data
US 2015/0319711 A1    Nov. 5, 2015

Related U.S. Application Data

(63) Continuation of application No. 13/079,558, filed on Apr. 4, 2011, now Pat. No. 9,020,555.
(Continued)

(51) Int. Cl.
*H04W 52/26* (2009.01)
*H04W 24/06* (2009.01)
(Continued)

(52) U.S. Cl.
CPC ........ *H04W 52/265* (2013.01); *H04W 24/06* (2013.01); *H04W 52/40* (2013.01);
(Continued)

(58) Field of Classification Search
None
See application file for complete search history.

(56) References Cited

U.S. PATENT DOCUMENTS

| 6,023,625 A | * | 2/2000 | Myers, Jr. ........... H04W 88/085 455/446 |
| 6,411,817 B1 | | 6/2002 | Cheng et al. |

(Continued)

FOREIGN PATENT DOCUMENTS

| CN | 101595650 A | 12/2009 |
| CN | 103797717 B | 11/2016 |

(Continued)

OTHER PUBLICATIONS

"U.S. Appl. No. 13/077,556, Non Final Office Action mailed May 14, 2012", 11 pgs.
(Continued)

*Primary Examiner* — Min Jung
(74) *Attorney, Agent, or Firm* — Schwegman, Lundberg & Woessner, P.A.

(57) ABSTRACT

A system and method for dynamically optimizing the performance of indoor distributed antenna systems communicate to user equipment is disclosed. The user equipment measures information describing the downlink signals such as the downlink data rates, the quality of the received signal, and the location of the user equipment. A service module collects this information and determines an optimized power level for each of the antenna units. The service module may optimize only one antenna unit power level or a subset of the antenna units within the distributed antenna system in a preferred embodiment. One or more of the antenna units then transmits downlink signals with the optimized power levels. The optimized power level may be less than the initial power level in a preferred embodiment. As a result, the performance of the indoor distributed antenna systems is enhanced.

25 Claims, 2 Drawing Sheets

Related U.S. Application Data

(60) Provisional application No. 61/321,113, filed on Apr. 5, 2010.

(51) Int. Cl.
*H04W 52/40* (2009.01)
*H04W 84/04* (2009.01)
*H04W 52/24* (2009.01)
*H04W 52/14* (2009.01)

(52) U.S. Cl.
CPC ........ *H04W 52/143* (2013.01); *H04W 52/244* (2013.01); *H04W 52/267* (2013.01); *H04W 84/045* (2013.01)

(56) References Cited

U.S. PATENT DOCUMENTS

| | | | |
|---|---|---|---|
| 6,580,905 | B1 | 6/2003 | Naidu et al. |
| 6,587,690 | B1 | 7/2003 | Di Huo et al. |
| 6,690,939 | B1 | 2/2004 | Jonsson et al. |
| RE41,936 | E | 11/2010 | Woodhead et al. |
| 8,311,027 | B2 | 11/2012 | Padovani et al. |
| 8,582,536 | B2 | 11/2013 | Laroia et al. |
| 9,020,555 | B2 | 4/2015 | Venkatraman et al. |
| 9,363,761 | B2 | 6/2016 | Venkatraman et al. |
| 2002/0094833 | A1 | 7/2002 | Lieshout et al. |
| 2004/0204105 | A1* | 10/2004 | Liang ............... H04B 7/0608 455/562.1 |
| 2005/0136961 | A1 | 6/2005 | Simonsson et al. |
| 2007/0042798 | A1 | 2/2007 | Chen et al. |
| 2007/0253385 | A1 | 11/2007 | Li et al. |
| 2008/0186107 | A1 | 8/2008 | Rhodes et al. |
| 2008/0192702 | A1* | 8/2008 | Song ................. H04W 52/265 370/332 |
| 2008/0214196 | A1 | 9/2008 | Sambhwani et al. |
| 2008/0252522 | A1 | 10/2008 | Asbridge |
| 2009/0080349 | A1 | 3/2009 | Rofougaran |
| 2009/0176448 | A1 | 7/2009 | Solum |
| 2009/0197632 | A1 | 8/2009 | Ghosh et al. |
| 2009/0213805 | A1 | 8/2009 | Zhang et al. |
| 2009/0285158 | A1 | 11/2009 | Rezaiifar et al. |
| 2009/0318183 | A1 | 12/2009 | Hugl et al. |
| 2010/0020704 | A1 | 1/2010 | Hu et al. |
| 2010/0080137 | A1 | 4/2010 | Vedantham et al. |
| 2010/0144282 | A1 | 6/2010 | Laroia et al. |
| 2010/0202392 | A1 | 8/2010 | Zhang et al. |
| 2010/0202431 | A1 | 8/2010 | Kazmi et al. |
| 2011/0223958 | A1* | 9/2011 | Chen ................. H04B 7/022 455/522 |
| 2011/0244853 | A1 | 10/2011 | Sheikh et al. |
| 2011/0244914 | A1 | 10/2011 | Venkatraman et al. |
| 2012/0100814 | A1 | 4/2012 | Soulhi et al. |
| 2012/0196611 | A1 | 8/2012 | Venkatraman et al. |

FOREIGN PATENT DOCUMENTS

| | | |
|---|---|---|
| CN | 106102155 A | 11/2016 |
| JP | 2003188817 A | 7/2003 |
| JP | 2007019594 A | 1/2007 |
| JP | 2010504686 A | 2/2010 |
| JP | 2011526442 A | 10/2011 |
| JP | 5961682 B2 | 8/2016 |
| WO | WO-2008035900 A1 | 3/2008 |
| WO | WO-2009061106 A2 | 5/2009 |
| WO | WO-2009134180 A1 | 11/2009 |
| WO | WO-2009134200 A1 | 11/2009 |
| WO | WO-2010000109 A1 | 1/2010 |

OTHER PUBLICATIONS

"U.S. Appl. No. 13/079,558, Non Final Office Action mailed Apr. 24, 2014", 14 pgs.
"U.S. Appl. No. 13/079,558, Notice of Allowance mailed Dec. 9, 2014", 8 pgs.
"U.S. Appl. No. 13/079,558, Response filed Oct. 22, 2014 to Non Final Office Action mailed Apr. 24, 2014", 11 pgs.
"U.S. Appl. No. 13/439,658, Advisory Action mailed Mar. 5, 2015", 3 pgs.
"U.S. Appl. No. 13/439,658, Final Office Action mailed Dec. 18, 2014", 23 pgs.
"U.S. Appl. No. 13/439,658, Non Final Office Action mailed Apr. 9, 2014", 22 pgs.
"U.S. Appl. No. 13/439,658, Response filed Feb. 10, 2015 to Final Office Action mailed Dec. 18, 2014", 14 pgs.
"U.S. Appl. No. 13/439,658, Response filed Sep. 26, 2014 to Non Final Office Action mailed Apr. 9, 2014", 11 pgs.
"Chinese Application Serial No. 201280027262.6, Office Action mailed Dec. 25, 2014", 26 pgs.
"European Application Serial No. 12767271.5, Extended European Search Report mailed Aug. 7, 2014", (Aug. 7, 2014), 6 pgs.
"European Application Serial No. 12767271.5, Office Action mailed Nov. 15, 2013", 3 pgs.
"European Application Serial No. 12767271.5, Response filed Feb. 4, 2014 to Office Action mailed Nov. 15, 2013", 13 pgs.
"International Application Serial No. PCT/US2011/030807, International Preliminary Report on Patentability mailed Oct. 11, 2012", 8 pgs.
"International Application Serial No. PCT/US2011/030807, International Search Report mailed Jun. 13, 2011", 1 pg.
"International Application Serial No. PCT/US2011/030807, Written Opinion mailed Jun. 13, 2011", 6 pgs.
"International Application Serial No. PCT/US2012/032184, International Preliminary Report on Patentability mailed Oct. 17, 2013", 11 pgs.
"International Application Serial No. PCT/US2012/032184, International Search Report mailed Jul. 10, 2012", 1 pg.
"International Application Serial No. PCT/US2012/032184, Written Opinion mailed Jul. 10, 2012", 9 pgs.
"U.S. Appl. No. 13/439,658, Examiner Interview Summary mailed Sep. 10, 2015", 3 pgs.
"U.S. Appl. No. 13/439,658, Final Office Action mailed Nov. 12, 2015", 33 pgs.
"U.S. Appl. No. 13/439,658, Non Final Office Action mailed Jun. 23, 2015", 27 pgs.
"U.S. Appl. No. 13/439,658, Notice of Allowance mailed Feb. 10, 2016", 7 pgs.
"U.S. Appl. No. 13/439,658, Response filed Jan. 12, 2016 to Final Office Action mailed Nov. 12, 2016", 14 pgs.
"U.S. Appl. No. 13/439,658, Response filed Sep. 23, 2015 to Non Final Office Action mailed Jun. 23, 2015", 12 pgs.
"Chinese Application Serial No. 201280027262.6, Office Action mailed Apr. 15, 2016", 8 pgs.
"Chinese Application Serial No. 201280027262.6, Office Action mailed Sep. 14, 2015", 17 pgs.
"Chinese Application Serial No. 201280027262.6, Response filed Jun. 23, 2016 to Office Action mailed Apr. 15, 2016", (English Translation of Claims), 16 pgs.
"Chinese Application Serial No. 201280027262.6, Response filed Dec. 29, 2015 to Office Action mailed Sep. 14, 2015", 8 pgs.
"Japanese Application Serial No. 2014-503956, Office Action mailed Feb. 2, 2016", 6 pgs.
"Japanese Application Serial No. 2014-503956, Response filed Apr. 26, 2016 to Office Action mailed Feb. 2, 2016", 7 pgs.

* cited by examiner

APPARATUS FOR DISTRIBUTED ANTENNA SYSTEM WITH DOWNLINK TRANSMISSION POWER CONTROL

RELATED APPLICATION INFORMATION

The present application is a continuation of U.S. application Ser. No. 14/677,696, filed Apr. 2, 2015, which claims priority under 35 U.S.C. Section 119(e) to U.S. Provisional Patent Application Ser. No. 61/321,113, filed Apr. 5, 2010, all of which are incorporated herein by reference in their entirety.

BACKGROUND OF THE INVENTION

1. Field of the Invention

The present invention relates generally to methods and systems related to wireless telephony. More particularly, the invention relates to wireless systems employing distributed antenna systems and related methods.

2. Description of the Prior Art and Related Background Information

Modern wireless telephone systems often employ distributed antenna systems ("DAS") for communicating with users within a cell region. The transmission power for the DAS must be optimized to enhance the network capacity. However, conventional wireless systems do not optimize cell capacity based on the real-time requirements of the users within the cell region.

Accordingly, a need exists to optimize the performance of wireless telephone systems employing distributed antenna systems.

SUMMARY OF THE INVENTION

In a first aspect the present invention provides a method for optimizing downlink transmission power of a distributed antenna system, comprising providing a common downlink signal to a plurality of separate antenna units in a distributed antenna system and varying gain of the antenna units to enhance system performance based on collected user information.

In a preferred embodiment the method for optimizing the downlink transmission power of a distributed antenna system further comprises collecting information describing the downlink signals from User Equipment (UE) including peak data rates of the downlink signals reported by the UE. Collecting information may further comprise collecting maximum sustainable data rates of the downlink signals reported by the UE and collecting the number of UEs having a QOS (Quality of Service) exceeding a QOS threshold. Varying the gain of the antenna units may comprise reducing gain of one or more antenna units to reduce multipath interference. Varying the gain of the antenna units may comprise varying a total gain of the distributed antenna system. Varying the gain of the antenna units may also comprise varying a link gain of an individual antenna unit. The antenna units may be grouped in indoor spaces separated by internal walls and varying the gain of the antenna units may comprise independently varying the gain of groups of the antenna units.

In another aspect the present invention provides a method for optimizing downlink transmission power of a distributed antenna system, comprising transmitting common downlink signals having a first power level from a first antenna unit and a second antenna unit to User Equipment (UE), wherein the first antenna unit and the second antenna unit are physically separated, collecting information describing the downlink signals reported by the UE, determining when a downlink transmission power of the first antenna unit and second antenna unit should be updated based on the collected information, and transmitting downlink signals having a second power level from the first antenna unit and the second antenna unit.

In a preferred embodiment of the method for optimizing the downlink transmission power of a distributed antenna system, collecting information describing the downlink signals preferably comprises collecting downlink data rates of the downlink signals reported by the UE, collecting signal quality information of the downlink signals reported by the UE, and collecting location information reported by the UE. Determining when a downlink transmission power of the first antenna unit and second antenna unit should be updated may further comprise estimating a current average capacity based on the collected information and comparing the current average capacity to a prior average capacity. The second power level may be less than the first power level when the current average capacity is less than the prior average capacity. The second power level may be greater than the first power level when the current average capacity is greater than the prior average capacity. The method may further comprise comparing the second power level to a maximum power threshold, and, when the second power level exceeds the maximum power level, reducing the second power level to the first power level. Collecting information describing the downlink signals may further comprise collecting peak data rates of the downlink signals reported by the UE, collecting maximum sustainable data rates of the downlink signals reported by the UE, and collecting the number of UEs having a QOS (Quality of Service) exceeding a QOS threshold. Determining when a downlink transmission power of the first antenna unit and second antenna unit should be updated may further comprise estimating a current average capacity based on the collected information and comparing the current average capacity to a prior average capacity. The first antenna unit and the second antenna unit may be located indoors. The downlink signal may comprise a single sector carrier signal.

In another aspect the present invention provides a distributed antenna system, comprising a distributed antenna system service module providing a downlink signal and a first antenna unit and a second antenna unit coupled to the distributed antenna system service module by transmission cables to receive the downlink signal and configured for wirelessly transmitting the downlink signal, wherein the first antenna unit and the second antenna unit are physically separated. The distributed antenna system service module is configured for controlling the transmission power levels of the first and second antenna units based on collected information from a plurality of User Equipment (UEs) receiving the downlink signals from the antenna units and transmitting uplink information to the antenna units.

In one preferred embodiment of the distributed antenna system the first and second antenna units are located indoors and cover separate service areas of a single space. The distributed antenna system may further comprise a third antenna unit and a fourth antenna unit, coupled to the distributed antenna system service module by transmission cables and configured for wirelessly transmitting the downlink signal, wherein the third antenna unit and the fourth antenna unit are physically separated in a second space separated by walls from the first and second antenna units. The distributed antenna system service module may be configured for controlling the transmission power levels of the third and fourth antenna units based on collected information from a plurality of User Equipment (UEs) receiving the downlink signals from the third and fourth antenna units and transmitting uplink information to the antenna units in the second space.

Further features and aspects of the invention are set out in the following detailed description.

DETAILED DESCRIPTION OF THE INVENTION

Figure 1:
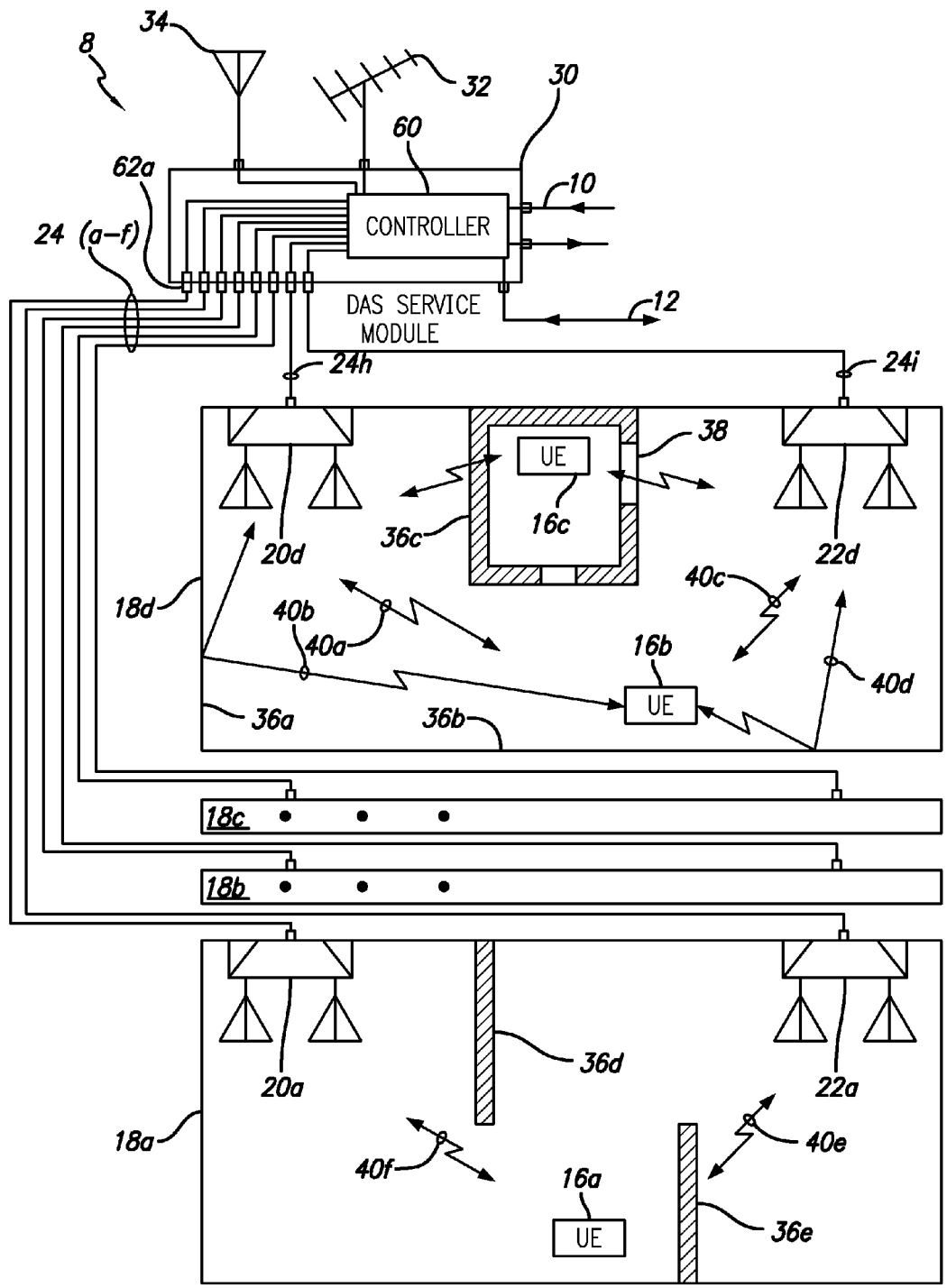
FIG. 1 is a representation of a distributed antenna system ("DAS") servicing multiple indoor rooms in accordance with the present invention.

It is an object of the present invention to provide a system and related methods for dynamically optimizing the performance of indoor distributed antenna systems for communicating to user equipment such as cellular telephones, smart phones, or other mobile devices. A major problem associated with indoor distributed antenna systems is multi-path fading. In an embodiment, the user equipment measures information describing the downlink signals transmitted by the antenna units such as the downlink data rates, the quality of the received signal, and the location of the user equipment. A service module collects this information and determines optimized power levels for each of the antenna units. The service module may optimize only one antenna unit or a subset of the antenna units within the distributed antenna system in a preferred embodiment. One or more of the antenna units then transmits downlink signals with the optimized power levels. The optimized power level may decrease in a preferred embodiment. As a result, the performance of the indoor distributed antenna systems is enhanced.

Modern mobile communications networks require enhanced efficiency and performance. These goals may be attained by increasing network capacity during peak usage hours, enhancing the data rates for mobile data devices while maintaining signal quality and network coverage, and reducing harmful interference to co-located wireless services. Modern smart phones transmit and receive both voice signals and data signals which place additional demands on the wireless system to respond to dynamically changing wireless traffic. Moreover, technological advances and evolution of communication standards place further demands on wireless service providers as the communication medium rapidly transitions from voice to on demand data.

Distributed antenna systems ("DAS") have been employed in indoor locations to provide better signal coverage, to improve network capacity, and to increase data rates in large office buildings, hospitals, stadiums, shopping malls, and outdoor venues such as college campuses. A typical DAS is a collection of small service antennas spread over a desired geographic area and connected by fiber or coax back to a donor node where base station signals are coupled onto DAS network. The DAS technology enables carriers to reduce gaps in coverage areas and dead spots in the macro network by partitioning the macro cell site into smaller regions.

Traditional deployments of DAS networks involve static engineering of DAS antenna units or nodes and remote units in which the antenna units operate with fixed target power levels per carrier. This traditional approach provides a certain quality of coverage in a given area. Traditional deployments only consider the macro signal path loss and signal strengths as part of the engineering exercise, but are unable to fine tune the system parameters to specific deployment scenarios or for specific capacity.

In traditional DAS systems (both passive and active), the received signal level of −75 dBm was used as a general design guideline for DAS systems. However, if these received signal levels lead to significant multipath, under some operational conditions it is highly advantageous to reduce received signal levels from −75 dBm down to −85 dBm if the orthogonality can be improved. This requires a DAS system capable to control the gain/transmitter power (and other operational parameters) remotely, at individual access nodes with the objective of optimizing the received signal levels (or path loss) to increase orthogonality in a specific environment and operational requirements.

Third generation systems such as 3G systems or 3.5 G HSDPA ("High-Speed Downlink Packet Access") systems support downlink speeds of 1.8, 3.6, 7.2 and 14.0 Mbit/s ("Megabits per second"). Higher downlink speeds are available with HSPA+, which provides downlink speeds of up to 42 Mbit/s and 84 Mbit/s with Release 9 of the 3GPP standards. OFDM ("Orthogonal Frequency Division Multiplexing") provides inherent advantages over CDMA ("Code Division Multiple Access") for systems having 10 MHz of bandwidth or more. Bandwidths in the range of 10 to 20 MHz are attainable with advanced antenna architectures such as Multiple Input Multiple Output ("MIMO") or Adaptive Antenna Systems ("AAS"). Extremely high peak data rates are attainable because OFDM requires less complex computations than those based on the CDMA protocol. HSDPA employs the modulation used in WCDMA of Quadrature Phase Shift Keying ("QPSK") and an advanced modulation scheme such as 16 Quadrature Amplitude Modulation ("16 QAM"). Depending on the condition of the radio channel, different levels of forward error correction (i.e., channel coding) can also be employed. For example, a three quarter coding rate requires that three quarters of the bits transmitted are user bits and one quarter of the bits are error correcting bits. The process of selecting and quickly updating the optimum modulation and coding rate is referred to as link adaptation.

A further advantage of HSDPA adaption is its full compatibility with WCDMA, and thus it can be deployed as a software only upgrade in newer WCDMA networks. Initially, Release 5 HSDPA capable devices will be capable of transmitting with 3.6 Mbps peak rates. Release 6 of an enhanced uplink protocol ("EUL"), also referred to as HSUPA ("High-Speed Uplink Packet Access"), will provide improved throughput, reduced latency, and increased capacity. EUL, as well as the Enhanced Dedicated Channel ("E-DCH"), provide data rates of up to 5.8 Mbps. The combination of HSDPA and EUL is called HSPA. To further boost the peak data rate and capacity, the 3GPP Release 7 introduced the HSPA evolution (also called HSPA+), which supports MIMO, 64 QAM in the downlink, and 16 QAM in the uplink. Release 8 supports downlink bitrates of 42 Mbps through a combination of 64 QAM and MIMO or through using dual carriers with 64 QAM modulation.

These technologies which support high data rates require radio link adaptation that fully utilizes channel capacity for each communication link in the wireless environment to maximize the throughput of scheduling-based systems. Conventional high data rate wireless links were deployed primarily in outdoor scenarios. Indoor wireless systems present additional challenges due to increased path losses and rapidly changing multipath signals which introduces complications into signal processing techniques supported by E-DCH. E-DCH was developed primarily for use in urban, suburban, and rural settings.

To address these indoor (in-building) deployment challenges, embodiments of the present invention provide a remotely manageable active DAS which enables dynamic system optimization based on operational parameters. These operational parameters include, but are not limited to, the peak data rate, the sustainable maximum data rate, the number of UEs ("User Equipment") at a given QOS ("Quality of Service") levels. DAS systems exhibit performance flexibility by employing co-operative multi-code optimization in HSPA. Systems employing the HSPA 7.2 protocol preferably operate in an environment without multi-path interference to obtain the full benefit of the code orthogonality.

Embodiments of the present invention contrast with conventional DAS systems. The conventional approaches, such as Release 7 MIMO on HSPA, suggest that the transmission signal strength should be increased to compensate for multipath effects. Embodiments of the present invention may be applied to other Radio Access Technologies ("RATs") such as, but not limited to Wi-Fi, WiMax, and other developing technologies. RATS can be implemented in a neutral host active DAS, especially in high traffic situations with radio access loading and balancing and multi-mode, multi-band UEs, is readily affordable while providing high level QOS not otherwise possible with a single radio access implementation. Moreover, some deployments such as for a stadium, the DAS system needs to minimize gain in selected areas especially when having a cell split (i.e. sectorized DAS). The ability to selectively control the gain in overlapping regions will reduce inter-sector interference.

Embodiments of the present invention include a flexible remote management system that can optimize EIRP per antenna in the path by varying the total DAS gain and link gain in the path per antenna. Moreover, embodiments may vary individual repeater gain (as in case of low power zinwave nodes) with the objective of altering the effective channel in order to maximize system performance. Therefore, it is desirable to employ active DAS system and method that avoids above mentioned limitations while providing means for enhanced wireless service.

Simulations suggest that the active DAS system exhibits enhanced performance compared to conventional systems. The SINR ("Signal to Interference-plus-Noise Ratio") for the received signal on a HS-DSCH ("High Speed Downlink Shared Channel") is given by the following equation $$SINR_{HS-DSCH} = \frac{SF_{16} \cdot P_{HS-DSCH}}{(1-\alpha) \cdot P_{own} + P_{other} + N_o} \quad \text{(Eqn. 1)}$$

where $\alpha$ is the orthogonality factor, $P_{own}$ is the total received power from the serving base station or antenna, $P_{Hs-DSCH=}$ is the total received power on the HS-DSCH channel, $P_{other}$ is the total received power from another base station, and $SF_{16}$ is the spreading factor of 16.

Equation 1 and the orthogonality factor $\alpha$ are well established parameters in analyzing performance of a HSPA network. A multipath environment can affect the orthogonality of the spreading codes, resulting in intra-cell interference from other codes. The impact of this is captured in the denominator of the equation by $(1-\alpha)*P_{own}$. Power from another code can result in self interference reducing SINR and, as a consequence, throughput.

TABLE 1

Simulated Performance of a DAS system

| Orthogonality Factor | Ec/Io −16 dB (Macro) | Ec/Io −13 dB (Macro) | Ec/Io −10 dB (DAS) |
|---|---|---|---|
| 0.4 | 250 | 402 | 1191 |
| 0.6 | 264 | 458 | 1665 |
| 0.8 | 279 | 537 | 2602 |
| 0.9 | 287 | 588 | 3599 |

Table I above is a simulation that illustrates the effects of the DAS. Ec/Io represents the energy per chip to interference ratio (another measure of SINR) that does not include the impact of the orthogonality factor $\alpha$. When the orthogonality factor is considered, the impact of lack of orthogonality is illustrated in Table I. For a Macro network with Ec/Io typically in range of −16 dB to −13 dB, throughput is as stated. However in a DAS network, Ec/Io is typically greater due to repeaters and may be −10 dB. However, to obtain the best performance, the orthogonality factor also has to be low. Note that the available link gain improved in the range of 62%-200%.

Table I illustrates a couple of aspects. First, one advantage of a DAS deployment improves the performance of the HSPA network (if the DAS power is set to provide −10 dB Ec/Io). Second, Table I illustrates the advantage of having a deployment with high degree of orthogonality. These two aspects highlight the importance of a DAS system that automatically adjusts the power of the DAS power amplifier until maximum performance is realized.

FIG. 1 is a representation of a DAS system 8 servicing multiple indoor rooms in accordance with the present invention. The DAS system 8 comprises a DAS Service Module 30 and multiple remote antenna units such as remote antenna units 20a and 22a. The DAS Service Module 30 comprises a controller 60 which is coupled to a fiber optic feed 10 for external communications, and a dedicated control and monitoring channel 12. A GPS antenna 34 and a donor service antenna 32 are also coupled to the controller 60. The controller is coupled to interfaces such as 62a, which are coupled to the remote antenna units via cables 24a-24f.

Interiors 18a-18d represents an outline of a floor or enclosed space such as multiple floors in an office building for example. The interiors 18a-18d may have internal obstructions such as walls 36a-36d. In this non-limiting example, each interior such as 18d may have two remote antenna units such as remote antenna units 20d and 22d. However, the use of one or more remote antenna units located throughout an interior is contemplated. The remote antenna units such as 20d and 22d communicate to the UEs such as UE 16c and 16b.

Each of these remote antenna units transmits downlink signals within an interior that travel multiple paths before reaching the UE. As a result, the UE receives a superposition of multiple copies of the transmitted signals which may result in constructive or destructive interference. This multipath interference may significantly affect the quality of service provided to the user as the user moves within the interior. For example, UE 16b receives downlink signals directly from remote antenna units 20d and 22d via paths 40a and 40c respectively. In addition, UE 16b also receives downlink signals that were partially reflected by walls 36a and 36b via paths 40b and 40d respectively. Hence, the quality of the service to UE 16b depends on overall interference of the downlink signals that traversed paths 40a-40c. The user may experience differing levels of the quality of service as the user moves within the interior 18d.

In other scenarios, the downlink signals received by the UE may be attenuated as a result of shadowing. For example, UE 16c may receive an attenuated downlink signal from remote antenna unit 20d because the signal passes though wall 36c. The strength of the downlink signal from remote antenna unit 22d may be stronger because the UE 16 receives the downlink signal through opening 38. Similarly, UE 16a will receive a stronger transmission signal from remote antenna unit 20a because path 40f is an unobstructed path. The UE 16a will receive a weaker signal from remote antenna unit 22a because the path 40e is obstructed by wall 36e.

Hence, a DAS network 8 supporting a single carrier with multiple remote transmitters may optimize transmission power level for each remote antenna unit based on the supported technology and environment. Feedback information from the UEs or mobile stations relating to downlink rate or channel quality is solicited for each DAS cluster serving a given area. This feedback information is analyzed to determine average data rate in the served cluster. In the case of DAS network repeating a macro signal, GPS information from mobile stations could be used to constrain analysis only to the area served by DAS. The downlink transmission power from all DAS remote antenna units serving the cluster is increased in steps from $P_{initial}$. The algorithm continues to increase power until the cluster capacity saturates. This algorithm can be utilized for a cluster repeating a single sector signal or a cluster implementing reuse of the same frequency.

Figure 2:
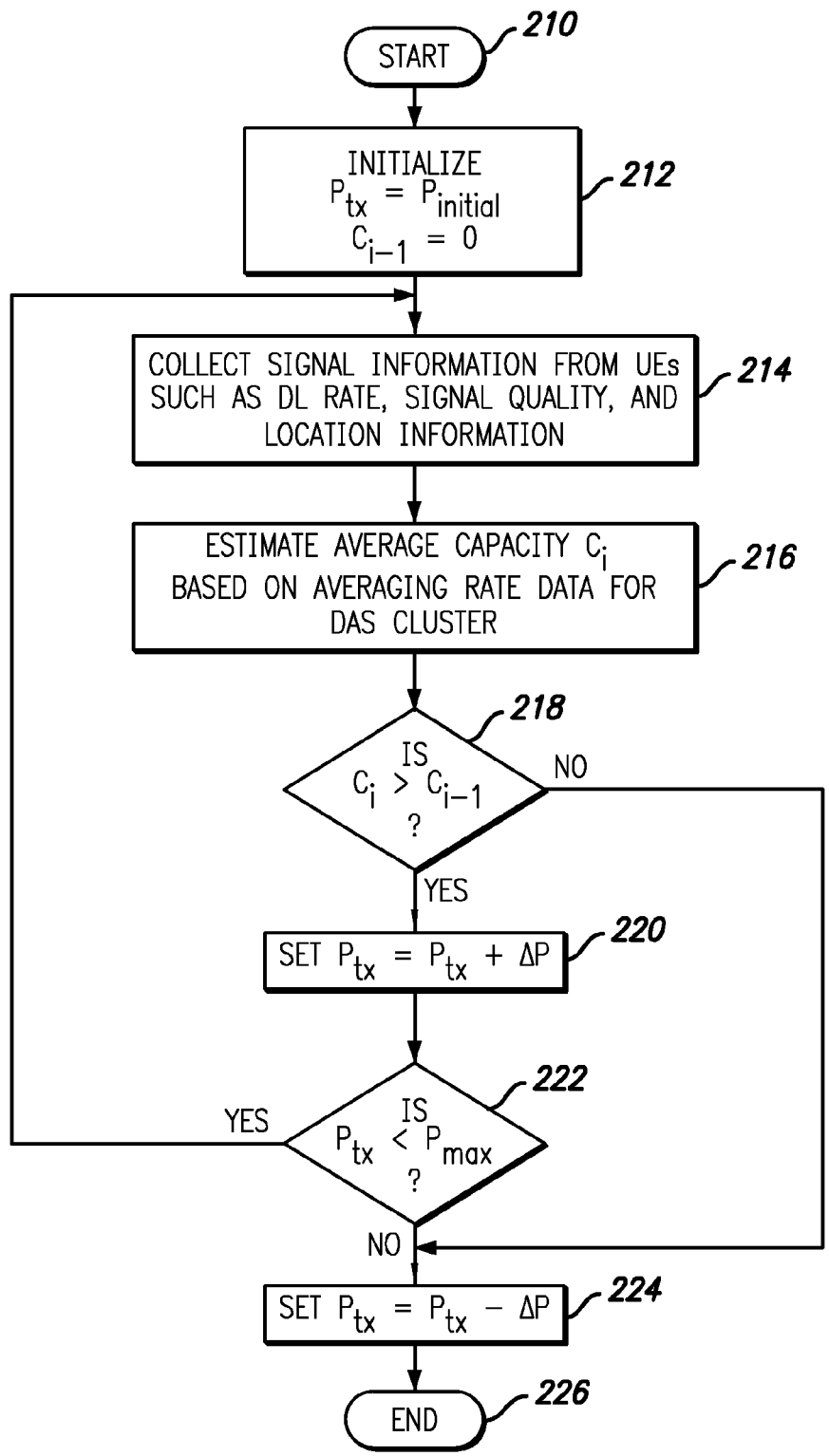
FIG. 2 is a flow chart illustrating an exemplary process for optimizing the downlink transmission power of remote antenna units within a distributed antenna system.

FIG. 2 is a flow chart illustrating an exemplary process for optimizing the downlink transmission power of the remote antenna units within a distributed antenna system 8. Essentially, the process collects signal information from the UEs and determines an average capacity $C_i$ of the system. If the capacity has improved since the prior iteration, the transmission power $P_{tx}$ increases and the next set of signal information is collected. On the other hand, if the average capacity $C_i$ has not improved since the prior iteration, the transmission power $P_{tx}$ is reduced. The transmission power $P_{tx}$ cannot exceed a maximum power level $P_{max}$.

Specifically, the process starts at step 210. The transmission power $P_{tx}$ is set to an initial power level $P_{initial}$ and the initial capacity $C_{i-1}$ is set to 0 (step 212). Signal information is collected from the UEs such as UE 16b and 16c (step 214). The signal information may include, but is not limited to, the downlink data rate, the download signal quality received by the UE, the location information of the UE, the peak data rates, the maximum sustainable data rates of the downlink signals, and/or the number of UEs having a QOS ("Quality of Service") exceeding a QOS threshold. The average capacity $C_i$ is estimated based on the collected signal information for the DAS cluster (step 216). The current estimated capacity $C_i$ is compare to the prior average capacity $C_{i-1}$ (step 218). If the average capacity of the system has improved, the process proceeds to step 220. If the capacity has not improved, the process proceeds to step 224 which reduces the transmission power $P_{tx}$ and terminates at step 226. The transmission power $P_{tx}$ is increased and is set to $P_{tx}+\Delta P$ (step 220). In an embodiment, the transmission power $P_{tx}$ is increased for all remote antenna units such as remote antenna units 20d and 22d. The transmission power $P_{tx}$ is increased for only one remote antenna such as only remote antenna 20d or a subset of all remote antenna units in a preferred embodiment. The transmission power $P_{tx}$ is then compared to a maximum transmission power $P_{max}$ (step 222). The maximum transmission power $P_{max}$ may be the maximum power for an individual remote antenna unit, or may be the maximum transmission power for a set of remote antenna units, or may be the maximum transmission power of the entire DAS system 8. If the transmission power $P_{tx}$ is less than the maximum transmission power $P_{max}$, the process proceeds to step 214. Otherwise, the process proceeds to step 224. The transmission power $P_{tx}$ is reduced and is set to $P_{tx}-\Delta P$ (step 224). The process terminates at step 226.

As discussed above, the presence of an indoor, scattering environment is detrimental. Moreover, signals from neighboring remote antenna units may add to the multi-path fading. For such scenarios, it may benefit to actually reduce the downlink transmission power from each remote antenna unit to the level that minimizes the overall spread.

The present invention has been described primarily as a system and means for dynamically optimizing the transmission power levels for downlink signal s transmitted from a distributed antenna system to user equipment such as cellular telephones or smart phones. In this regard, the system and means for optimizing transmission power levels for downlink signals are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. An apparatus for a distributed antenna system (DAS) configured to communicate with a plurality of remote antenna units to extend coverage for at least one base station, the apparatus comprising:
    transceiver circuitry to receive downlink signals from the at least one base station for communications to the remote antenna units and to transmit uplink signals to the at least one base station based on signals received from the remote antenna units; and
    controller circuitry operatively coupled to the remote antenna units and configured to control multiple transmissions of the downlink signals from the transceiver circuitry to the remote antenna units via a common downlink signal, including controlling downlink transmission power levels of the remote antenna units, using the common downlink signal and based, at least in part, on signal information received from at least one of the remote antenna units,
    wherein the downlink signals are transmitted by the transceiver circuitry to multiple antenna units of the remote antenna units, and the remote antenna units are to provide coverage within a service area of the distributed antenna system.

2. The apparatus of claim 1, wherein the transceiver circuitry is further configured to:
    convert radio-frequency (RF) downlink signals received from the at least one base station to digital downlink signals;

provide the digital downlink signals to the remote antenna units for conversion into RF downlink signals for transmission within the service area;

receive digital uplink signals from the remote antenna units; and convert the digital uplink signals to RF uplink signals for transmission to the at least one base station.

3. The apparatus of claim 2 wherein the controller circuitry is configured to:

provide a common downlink signal to the remote antenna units; and set the downlink transmission power levels of the remote antenna units.

4. The apparatus of claim 3 wherein the downlink transmission power levels are based, at least in part, on the signal information.

5. The apparatus of claim 3 wherein the common downlink signal comprises a pilot signal.

6. The apparatus of claim 3 wherein the signal information comprises interference estimations collected from signal information at the remote antenna units.

7. The apparatus of claim 3 wherein the signal information comprises quality-of-service (QoS) information collected from signal information at the remote antenna units.

8. The apparatus of claim 3 wherein the signal information comprises downlink rate and location information collected from signal information at the remote antenna units.

9. The apparatus of claim 3 wherein the signal information comprises signal information collected at the remote antenna units from one or more user equipments (UEs).

10. The apparatus of claim 3 wherein the signal information comprises signal information collected at one or more remote antenna units from signals transmitted by another one or more remote antenna units.

11. The apparatus of claim 3 further comprising an interface between the controller circuitry and the remote antenna units, wherein the controller circuitry is configured to provide command signals over the interface for configuring the downlink transmissions by the remote antenna units.

12. The apparatus of claim 11 wherein the command signals are configured to individually set downlink transmission power levels of the remote antenna units.

13. The apparatus of claim 1 wherein the controller circuitry is further configured to analyze interference levels and select frequencies for the RF downlink signals utilized by the remote antenna units.

14. The apparatus of claim 1 wherein the remote antenna units are configured to monitor network conditions and provide feedback for use by the apparatus to control transmission of downlink signals.

15. The apparatus of claim 1 wherein the DAS is configured to operate as part of wireless cellular network in accordance with a long-term evaluation (LTE) standard.

16. The apparatus of claim 1 wherein the DAS is configured to be employed in a building to improve coverage within the building.

17. A method for operating a distributed antenna system (DAS) configured to communicate with a plurality of remote antenna units to extend coverage for at least one base station, the method comprising:

receiving downlink signals from the at least one base station for communications to the remote antenna units;

transmitting uplink signals to the at least one base station based on signals received from the remote antenna units; and controlling multiple transmission of the downlink signals to the remote antenna units, including control of downlink transmission power levels of the remote antenna units using a common downlink signal and based, at least in part, on signal information received from at least one of the remote antenna units, wherein the remote antenna units are to provide coverage within a service area of the distributed antenna system.

18. The method of claim 17 further comprising:

converting radio-frequency (RF) downlink signals received from the at least one base station to digital downlink signals;

providing the digital downlink signals to the remote antenna units for conversion into RF downlink signals for transmission within the service area;

receiving digital uplink signals from the remote antenna units; and converting the digital uplink signals to RF uplink signals for transmission to the at least one base station.

19. The method of claim 17 further comprising:

providing a common downlink signal to the remote antenna units; and setting the downlink transmission power levels of the remote antenna units.

20. The method of claim 19 wherein the downlink transmission power levels are set based, at least in part, on the signal information, and wherein the signal information comprises signal information collected at the remote antenna units from one or more user equipments (UEs).

21. A distributed antenna system (DAS) configured to extend coverage within a building, the DAS comprising:

a plurality of remote antenna units to provide coverage within the building;

transceiver circuitry to receive downlink signals from at least one base station for communications to the remote antenna units and to transmit uplink signals to the at least one base station based on signals received from the remote antenna units; and controller circuitry to control multiple transmissions of the downlink signals from the transceiver circuitry to the remote antenna units via a common downlink signal, including controlling downlink transmission power levels of the remote antenna units, using the common downlink signal and based, at least in part, on signal information received from at least one of the remote antenna units, wherein the signal information comprises signal information collected at the remote antenna units from one or more user equipments (UEs).

22. The DAS of claim 21 wherein the controller circuitry is configured to:

provide a common downlink signal to the remote antenna units; and set the downlink transmission power levels of the remote antenna units based, at least in part, on the signal information, wherein the common downlink signal comprises a pilot signal.

23. The DAS of claim 22 wherein the signal information comprises interference estimations collected from signal information at the remote antenna units.

24. The DAS of claim 22 wherein the signal information comprises quality-of-service (QoS) information collected from signal information at the remote antenna units.

25. The DAS of claim 22 wherein the signal information comprises downlink rate information collected from signal information at the remote antenna units.

* * * * *